(12) United States Patent
Subramanian

(10) Patent No.: US 12,479,405 B2
(45) Date of Patent: Nov. 25, 2025

(54) SYSTEM AND METHOD FOR SURFACE ADAPTIVE BRAKING

(71) Applicant: VOLVO TRUCK CORPORATION, Gothenburg (SE)

(72) Inventor: Chidambaram Subramanian, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 43 days.

(21) Appl. No.: 18/258,377

(22) PCT Filed: Dec. 23, 2020

(86) PCT No.: PCT/US2020/066813
§ 371 (c)(1),
(2) Date: Jun. 20, 2023

(87) PCT Pub. No.: WO2022/139831
PCT Pub. Date: Jun. 30, 2022

(65) Prior Publication Data
US 2024/0034290 A1 Feb. 1, 2024

(51) Int. Cl.
*B60T 8/17* (2006.01)
*B60T 8/1761* (2006.01)
*B60T 8/1763* (2006.01)

(52) U.S. Cl.
CPC ...... *B60T 8/17636* (2013.01); *B60T 8/17616* (2013.01); *B60T 2210/122* (2013.01); *B60T 2240/03* (2013.01)

(58) Field of Classification Search
CPC ............. B60T 8/17636; B60T 8/17616; B60T 2210/122; B60T 2240/03; G08G 1/0112;
(Continued)

(56) References Cited

U.S. PATENT DOCUMENTS

| 3,525,553 A | 8/1970 | Carp et al. |
| 8,195,372 B2 | 6/2012 | Garcia et al. |

(Continued)

FOREIGN PATENT DOCUMENTS

| EP | 3581454 A1 | 12/2019 |
| JP | 2010228619 A | 10/2010 |

OTHER PUBLICATIONS

International Search Report and Written Opinion of the International Searching Authority in corresponding International Application No. PCT/US2020/066813 mailed Sep. 13, 2021 (13 pages).

(Continued)

*Primary Examiner* — Hai H Huynh
(74) *Attorney, Agent, or Firm* — Venable LLP; Jeffri A. Kaminski

(57) ABSTRACT

Systems, methods, and computer-readable storage media for using neural networks to ensure the braking capabilities of articulated vehicles are adapted to prevent jackknifing. A system can receive operational parameters associated with both a vehicle and a trailer being towed by the vehicle. The system can also identify a current surface condition and predict, using a neural network, road conditions for a portion of the road which the vehicle is approaching. When distinctions between current and predicted, future conditions are defined, and the system can cause modification of the operational parameters of the vehicle and/or the trailer.

20 Claims, 4 Drawing Sheets

(58) Field of Classification Search
CPC .............. G08G 1/0129; G08G 1/0141; G08G 1/096716; G08G 1/096725; G08G 1/096783; G08G 1/096791
USPC .............................................. 701/71, 73, 75
See application file for complete search history.

(56) References Cited

U.S. PATENT DOCUMENTS

| | | | |
|---|---|---|---|
| 9,187,099 B2 * | 11/2015 | Powers | .................. G08G 1/015 |
| 9,963,132 B2 | 5/2018 | Singh | |
| 12,111,334 B2 * | 10/2024 | Kulkarni | .................... G01P 3/48 |
| 2011/0264300 A1 | 10/2011 | Tuononen | |
| 2015/0166072 A1 | 6/2015 | Powers et al. | |
| 2018/0218596 A1 | 8/2018 | Castelli et al. | |

OTHER PUBLICATIONS

European Communication under Rule 71(3) EPC dated Sep. 8, 2025 in corresponding European Patent Application No. 20842151.1, 6 pages.

* cited by examiner

SYSTEM AND METHOD FOR SURFACE ADAPTIVE BRAKING

CROSS-REFERENCE TO RELATED APPLICATIONS

This application is a U.S. National Stage application of PCT/US2020/066813, filed Dec. 23, 2020 and published on Jun. 30, 2022 as WO 2022/139831, all of which is hereby incorporated by reference in its entirety.

BACKGROUND

1. Technical Field

The present disclosure relates to surface adaptive braking, and more specifically to using neural networks to ensure the braking capabilities of articulated vehicles are adapted to prevent jackknifing.

2. Introduction

Articulated vehicles are vehicles which have a permanent or semi-permanent pivot joint connecting parts of the vehicle, which can allow the vehicle to turn more sharply. Examples of articulated vehicles can include buses, trains, a truck pulling a trailer, a car pulling boat, etc. Articulated vehicles often have connected brakes, such that when the driver of the front vehicle engages the brakes of the front vehicle the brakes of the trailing vehicle also engage.

However, under certain conditions these connected braking systems can result in a difference of deceleration between the front vehicle and the trailing vehicle, such that the trailing vehicle is moving faster than the front vehicle. For example, if a truck towing a trailer skids, the trailer may push the truck from behind until the cab of the truck spins and faces backwards.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a processor within a vehicle, from a plurality of tire sensors associated with tires of the vehicle, first road condition data, wherein: the vehicle is towing a trailer; the vehicle has first operational parameters which are associated with braking of the vehicle; the trailer has second operational parameters which are associated with braking of the trailer; determining, via the processor and based on the first road condition data, a current surface condition; receiving, at the processor from a plurality of other vehicles, second road condition data; executing, via the processor, a machine learning algorithm, wherein: inputs to the machine learning algorithm comprise the first road condition data and the second road condition data; and outputs of the machine learning algorithm comprise an approaching surface condition; and modifying, via the processor, at least one of the first operational parameters and the second operational parameters based on at least one of: a distinction between the current surface condition and the approaching surface condition; and distinct slip ratios of the vehicle and the trailer based on the current surface condition.

An articulated vehicle configured to perform the concepts disclosed herein can include: a trailer; a truck configured to pull the trailer; a plurality of tire sensors; a processor; a non-transitory computer-readable storage medium having instructions stored which, when executed by the processor, cause the processor to perform operations comprising: receiving first operational parameters associated with braking of the truck; receiving second operational parameters associated with braking of the trailer; receiving, from the plurality of tire sensors, first road condition data; determining, via the processor and based on the first road condition data, a current surface condition; receiving, from a plurality of other vehicles, second road condition data; executing a machine learning algorithm, wherein: inputs to the machine learning algorithm comprise the first road condition data and the second road condition data; and outputs of the machine learning algorithm comprise an approaching surface condition; and generating an operating mode of the vehicle, the operating mode being based the current surface condition, the approaching surface condition, the first operational parameters, and the second operational parameters, the operating mode being one of a plurality of modes selected from a list comprising: a normal mode, where no changes to at least one operational parameter of the first operational parameters and the second operational parameters are needed based on a distinction between the current surface condition and the approaching surface condition; a warning mode with a severity, where at least one operational parameter of the first operational parameters and the second operational parameters is to be modified based on a distinction between the current surface condition and the approaching surface condition; and a poor surface mode, where at least one operational parameter of the first operational parameters and the second operational parameters is to be modified based on the current surface condition, the first operational parameters, and the second operational parameters; and modifying at least one of the first operational parameters and the second operational parameters based on at least one of: a distinction between the current surface condition and the approaching surface condition; and distinct slip ratios of the truck and the trailer based on the current surface condition.

A non-transitory computer-readable storage medium configured as disclosed herein can have instructions stored which, when executed by a computing device, cause the computing device to perform operations which can include: receiving, at the processor within the vehicle, from a plurality of tire sensors associated with tires of the vehicle, first road condition data, wherein: the vehicle is towing a trailer; the vehicle has first operational parameters which are associated with braking of the vehicle; and the trailer has second operational parameters which are associated with braking of the trailer; determining, via the processor and based on the first road condition data, a current surface condition; receiving, at the processor from a plurality of other vehicles, second road condition data; executing, via the processor, a machine learning algorithm, wherein: inputs to the machine learning algorithm comprise the first road condition data and the second road condition data; and outputs of the machine learning algorithm comprise an approaching surface condition; and modifying, via the processor, at least one of the first operational parameters and the second operational parameters based on at least one of: a distinction between the current surface condition and the approaching surface condition; and distinct slip ratios of the vehicle and the trailer based on the current surface condition.

DETAILED DESCRIPTION

Figure 1:
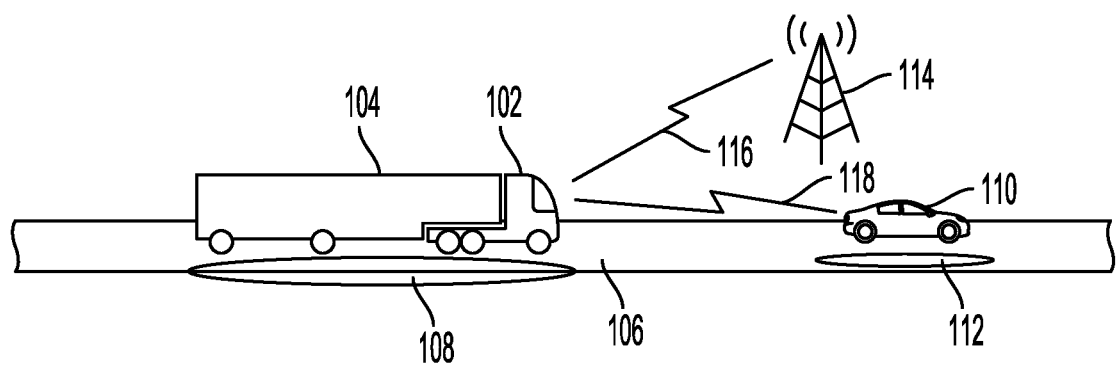
FIG. 1 illustrates an example of an articulated vehicle receiving information from multiple sources.

Various embodiments of the disclosure are described in detail below. While specific implementations are described, it should be understood that this is done for illustration purposes only. Other components and configurations may be used without parting from the spirit and scope of the disclosure.

To ensure that both parts of the articulated vehicle travel (and specifically decelerate) at respective rates which prevent jack-knifing or losing stability, regardless of surface conditions, systems configured as described herein can use data collected from sensors within the articulated vehicle components, data received from other vehicles, and data received from roadside infrastructure. The received data can be input into a neural network model, which predicts current and upcoming surface conditions for the road upon which the vehicle is travelling. Based on the vehicle data (including vehicle state data) and the output(s) of the neural network model, vehicle control systems can issue warnings or other notifications regarding potential danger in current or approaching road conditions. If the vehicle is configured with actuators or other mechanisms for modifying the braking capabilities of one or more parts of the articulated vehicle, the warnings or notifications can cause the vehicle components to adjust while the vehicle is in operation. If the vehicle is not configured with actuators or other self-adjustment capabilities, the warnings or notifications can be provided to the driver or another individual, who can adjust their driving accordingly and/or manually modify the vehicle components.

To prevent jack-knifing or loss of stability, the systems and methods disclosed herein can, for example, have a trailer decelerating faster or at an equal rate compared to its truck/tractor. Even if the system allows the trailer to decelerate slower than the tractor, the system will ensure the deceleration of the trailer is not excessive (beyond a threshold difference) compared to the tractor's deceleration. In some configurations and scenarios, the threshold difference between tractor and trailer decelerations can vary based on the speed of the articulated vehicle, such that at a high speed when detecting different surface conditions, whereas in other situations the threshold difference can be fixed or predetermined.

Consider the following example. As a tractor-trailer combination vehicle is driving, sensors in the truck and/or trailer detect and/or predict the current road conditions over which the vehicle is travelling. For example, the tires of the truck and/or trailer can have sensors which identify if the tire is in contact with sand, asphalt, concrete, ice, oil, etc. In some configurations, a single surface for the entirety of the tractor-trailer can be identified based on the data from one or more of the tire sensors, whereas in other configurations each individual tire sensor can provide an individual contact surface for the corresponding tire. In some cases, current road conditions can be further based on current vehicle configuration data and/or vehicle status information, such as current throttle/velocity, current slip ratios, and other data indicating to the control system how the wheels should be turning (assuming the velocity is maintained) compared to how the wheels are actually turning.

The tractor-trailer also receives road condition data from other vehicles via vehicle-to-vehicle (V2V) communication. For example, a car travelling ahead of the tractor-trailer, in the same direction of the tractor-trailer, can communicate that the road conditions two hundred meters ahead of the tractor-trailer are slick with rain. Likewise, a second car travelling further ahead, travelling toward the tractor-trailer, can communicate that the road conditions five hundred meters ahead of the tractor-trailer are icy.

The tractor-trailer, in addition to the V2V communications, can receive communications from road-side infrastructure, also referred to as vehicle-to-infrastructure (V2I) communication. For example, a radio tower near the road up which the tractor-trailer is travelling can broadcast a warning, received by a communications system within the tractor, that snow is starting to fall. Likewise, there may be a sign near the road broadcasting a construction warning.

The V2V and V2I data (which, in combination, may be referred to as V2X communications) can be used, with the current road condition data captured by the tractor-trailer, to predict upcoming road conditions. For example, both the V2X data and the current road condition data captured by the tractor-trailer can be input into a neural network model executed by a processor aboard the tractor-trailer. Executing the neural network model, converted to machine executable code as a machine learning algorithm, with these inputs results in an output of a probable future road condition, which can be communicated to a control system.

The vehicle control system can use the output(s) of the neural network, the vehicle sensor data, current vehicle state data (such as current configurations of vehicle control components), and/or the V2X data to determine how to operate the braking system of the articulated tractor-trailer. More specifically, the control system can determine if a need exists to change the operational parameters (e.g., understeer allowable band, over steer allowable band, slip ratio band, pedal movement to acceleration demand) of the tractor and/or trailer. In making that determination, the control system can determine a mode in which to operate the tractor-trailer braking system.

Exemplary modes in which the vehicle can operate, and which are determined by the control system, can include a normal mode, one or more warning modes, and a poor surface mode. A normal mode could indicate that the tractor-trailer should operate with normal parameters in effect for a dry, clean road surface, and may represent that there is no significant change predicted in the approaching road surface. A warning mode can indicate that there is a predicted change in the road surface requiring caution. The warning mode can include one or more sub-modes which indicate a severity of the predicted conditions in the approaching road surface. For example, in a less severe warning, the slip ratio may be expanded to a wider range than the normal range; in a more severe warning, the slip ratio may be expanded to a yet wider range again, as well as suggesting changes in pedal movement. In some configurations, these warning modes can be numbered, such as one to ten, with a warning mode one being less severe than a warning ten. A poor surface mode can indicate that the current road surface where the tractor-trailer is operating corresponds to a dangerous or difficult road surface, and can have distinct categories such as wet, ice, snow, mud, gravel, sand, etc. For each of the respective categories, there can be a distinct set of parameters indicating how the tractor-trailer (and specifically, the braking system of the tractor-trailer) should be modified to adapt for the approaching road surface.

As the truck-trailer approaches the predicted road area, the control system changes to one of the warning modes if the predicted conditions for the predicted road area differ from the current road conditions. As more information becomes available from on-board sensors and V2X communications, the control system can iteratively update the warning mode and, if necessary, change to one of the poor surface modes upon reaching the predicted road area. In addition, if upon reaching the predicted road area the conditions are determined to be dry or normal, the control system can instead revert the operating mode to the normal mode.

The control system can produce control signals which modify aspects of vehicular control systems. Non-limiting examples of the vehicle control systems which can be affected by the control signals include Antilock Braking Systems (ABS), Electronic Stability Control (ESC), and/or Traction Control System (TCS), Electronic Stability Program (ESP), hill start aid, brake monitoring, bad brake balance, coupling force control, service braking, etc. The EBS can receives signals from various sensors through Controller Area Network (CAN) bus communication. In some configurations, the Electronic Braking System (EBS) software which controls the ABS, ESC, TCS, and/or other vehicle control systems can include, as part of the software, the Artificial Neural Network (ANN) described herein. Converted to code, the embedded ANN can operate as a machine learning algorithm.

Some vehicles can be configured to include sensors which can detect data from approaching road areas and predict the condition of the road from that data. That data can then be combined with data from V2X communications for input into the neural network model, if available. For example, the tractor of a tractor-trailer articulated vehicle can have vision sensors which predict the composition of an approaching road area, then relay that vision sensor data to the neural network model as part of the overall vehicle information/sensor data used to predict approaching road areas.

The neural network model receives V2X communications and current vehicle information (including sensor data), then outputs a predicted road condition for the approaching road area. For example, the neural network model can determine a predicted road condition for the approaching road area from the sensor data and the V2X communications. When a difference exists between the current road conditions and the predicted road conditions, a warning can be issued, where the warning has a level of severity based on a level of distinction or danger between the current and approaching road conditions.

As an example of how to train the neural network which in turn is converted to executable code as a machine learning algorithm, a vehicle manufacturer or other entity can collect known road condition data, known V2X communications, and known vehicle sensor data (corresponding to the vehicle information and sensor data used as inputs during operation). This data can be collected from multiple vehicles under multiple conditions, preferably with the amount of data collected from each vehicle being at least thirty minutes of operation, though the amount of data can vary.

In this example, (1) the known road conditions, (2) the known V2X communications, and (3) the known vehicle sensor data, can be compared via a sensitivity analysis, resulting in correlations between (1) the known road conditions, (2) the known V2X communications, and (3) the known vehicle sensor data. For example, the sensitivity analysis can execute models (such as a one-at a time test, a derivative-based local method, regression analysis, variance-based method, screening, scatter plots, etc.) to define how a given input/variable affects the likelihood of a specific road condition existing. More specifically, the system can receive the known vehicle sensor data collected and the known V2X communications and determine how they relate to known road conditions. The correlation outputs of the sensitivity analysis define the likelihood of a given variable predicting an approaching road condition.

The outputs of the sensitivity analysis, as well the sensitivity analysis training data, can then be used by to construct a neural network. For example, the correlations and test data associated with the sensitivity analysis can be input into Python, MatLab®, or other development software configured to construct neural network based on factor-specific data. Depending on the specific scenario, users can adjust the neural network construction by selecting from optimization methods including (but not limited to) the least-squares method, the Levenberg-Marquardt algorithm, the gradient descent method, or the Gauss-Newton method. The neural network can then make predictions of the approaching road conditions given input variables corresponding to the same features which were used to train the neural network, the vehicle sensor data and V2X communications. The neural network can then be converted to machine code and uploaded into memory, where upon execution by a processor the neural network operates as a machine learning algorithm.

In some configurations, the neural network can determine, based on multiple V2X communications and/or the vehicle sensor data, that information received is reliable, false, or needs to be updated. For example, if fifty vehicles indicate, via V2X communications, that they are currently wet while the vehicle sensors indicate that the vehicle alone is dry, the neural network may determine to ignore the vehicle's sensor data (more specifically, the vehicle sensor data is not given any weight in predicting the current and approaching road conditions). Likewise, if some of the V2X communications contradict one another and/or the vehicle sensor data, those contradictory V2X communications may be ignored or otherwise unweighted in the neural network model analysis. In addition, the weighting of an input to the neural network model can be affected by a time since the information was received, such that data received five minutes ago has more value than data received thirty minutes ago.

As an example configuration, the system (contained within an articulated vehicle) collects data from infrastructure components or a vehicle ahead of the articulated vehicle. From the data, the system can identify approaching road surfaces, and use the data with machine learning algorithms to determine a severity level or a warning level. Using data from tire sensors, the system can constantly determine if the currently measured surface condition is the same as a previously communicated surface, and accordingly determine if the warning level should be changed (if, for example, the surface condition changed).

In a first scenario for this configuration, a car ahead of the articulated vehicle wirelessly communicates that there is a wet surface approaching. This input will pass through a neural network to determine what should be the warning level (1-10). Based on previous training, the neural network outputs a warning level "7". When the articulated vehicle reaches the location that the car had indicated has a wet surface, a tire sensor of the articulated vehicle will identify what is the actual surface condition (that is the system verifies the previously received surface condition information). If the surface condition detected by the tire sensor matches the surface condition communicated from the other car, then the neural network can determine the appropriate surface mode (such as a "Poor Surface" mode) and modify the necessary parameters of the articulated vehicle to stay safe. In some configurations, when warning mode 7 was determined, and before reaching the wet surface location with subsequent verification, the parameters of the articulated vehicle could have changed. As an example of how the slip ratio could have changed throughout this scenario:

Starting desired slip ratio—15%
Warning mode 7 determined—system modifies desired slip ratio to 10%
Poor surface mode detected—system modifies desired slip ratio to 5%

In a second scenario, the system could again receive a wireless communication indicating a wet surface is approaching, and again the neural network can output a warning level "7". However, in this case when the articulated vehicle arrives at the supposedly wet surface location, the tire sensor identifies a different surface condition than had previously been communicated. Because the surfaces do not match, then a check layer can set the surface mode to "Normal" and modify to original parameters from the warning parameters.

As an example of how the slip ratio could have changed throughout this second scenario:

Starting desired slip ratio—15%
Warning mode 7 determined—system modifies desired slip ratio to 10%
Normal mode detected—system modifies desired slip ratio back to 15%

In both example scenarios, the parameter being adjusted is the slip ratio. However, in practice there can be multiple parameters adjusted given different conditions or modes of operation, thereby assuring jack-knifing or other loss of stability does not occur.

With that background, the disclosure turns to the examples provided in the figures. FIG. 1 illustrates an example of an articulated vehicle 102, 104 receiving information from multiple sources. For example, the articulated vehicle includes a truck 102 pulling a trailer 104, and is currently operating over a portion of the road 108. Sensors within the tires of the truck 102 and/or trailer 104 can detect the road conditions of the road 108 over which the truck 102 and trailer 104 are currently operating. The truck 102 contains communications equipment, which allows it to receive signals 116 from infrastructure 114 (such as roadside towers, antenna, signs, etc.). The truck 102 can also receive signals 112 from other vehicles 110 providing information about the current road conditions 112 over which the other vehicles 110 are currently operating. The truck 102 can input the V2X communications 116, 112, as well as the current surface conditions 108 over which the truck 102 is operating, into a neural network model, which can predict a the conditions for an approaching portion 106 of the road. The truck 102 and/or the trailer 104 can then have components reconfigured to ensure safety as the truck 102 and trailer approach the predicted portion of the road 106.

Figure 2:
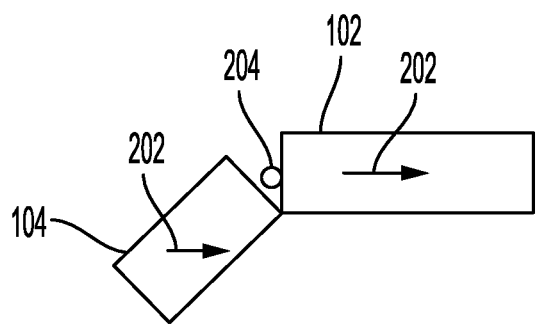
FIG. 2 illustrates an example of an articulated vehicle jackknifing.

FIG. 2 illustrates an example of an articulated vehicle jackknifing. In this example, the truck 102 of FIG. 1 is pulling the trailer 104, connected via a pivot joint 204. If the braking capabilities of both the truck 102 and trailer 104 are not sufficiently similar for the surface upon which they are travelling, the truck 102 and trailer 104 may decelerate at different speeds. While both portions 102, 104 continue to move in the same direction 202, because of the distinct speeds the trailer 104 may begin to push the truck 102, forcing an angle to form between the two which can, if not corrected, lead to an accident.

Figure 3:
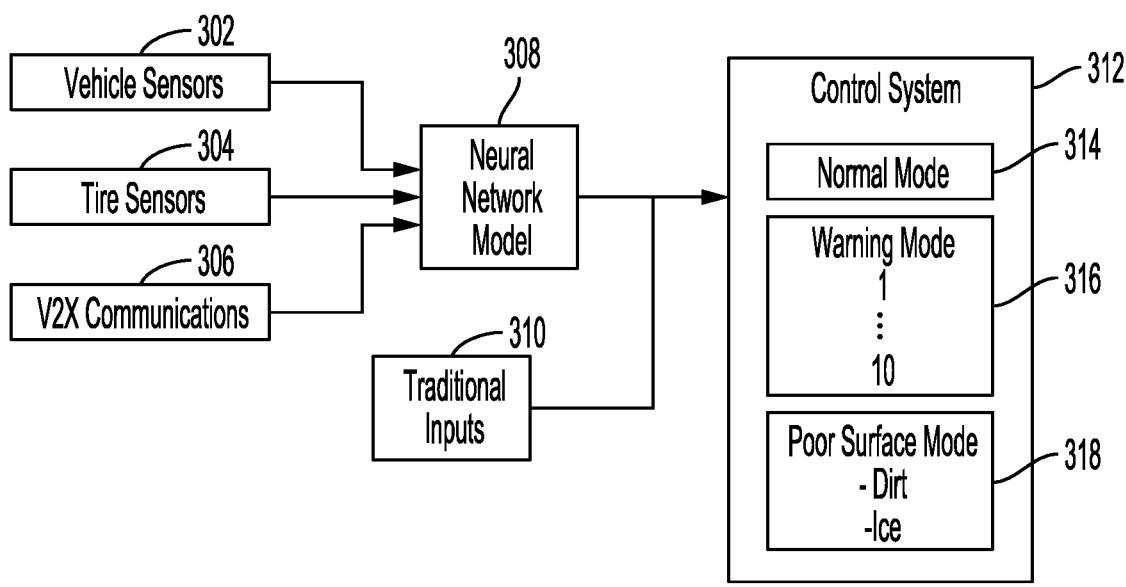
FIG. 3 illustrates an example flow chart of a neural network model receiving data and a control system that defines an operating mode for the vehicle.

FIG. 3 illustrates an example flow chart of a neural network model 308 receiving data 302, 304, 306 and a control system 312 that defines an operating mode 314, 316, 318 for the vehicle. Preferably, the illustrated data processing occurs within a computer system aboard a vehicle as the vehicle is travelling down a road. As illustrated, example data which can be received by the neural network model 308 can include vehicle sensor data 302, such as the vehicle velocity, vision sensors, load, braking capacity, etc. Additional data received by the neural network model 308 can include tire sensor data 304, which can indicate tire pressure(s) of the tire, the surface upon which the vehicle is currently operating, and/or other information associated with the tire. In addition, the data received by the neural network model 308 can include V2X communications 306, which can include communications received by the vehicle from infrastructure (V2I communications) and/or vehicle to vehicle (V2V) communications.

The neural network model 308 can output a prediction of the conditions for a road area being approached by the vehicle. The predicted road conditions, as well as traditional inputs 310 (such as CAN data, currently traversed road conditions, velocity, etc.) can be input to a control system 312, which can in turn define an operations mode 314, 316, 318 for the vehicle. Exemplary operations mode can include: a normal mode 314, where the vehicle is currently configured to operate on both the current and the approaching road portions based on the condition of the current road portion and the predicted condition of the approaching road portion; a warning mode 316, where the warning mode has various sub-modes based on a severity of a distinction between the vehicle's current operating condition and the predicted condition of the approaching road portion; and a poor surface mode 318, where the vehicle is currently traversing conditions such as ice or dirt, and where vehicle components may need to be modified or reconfigured to ensure safety.

When the control system 312 defines an operations mode 314, 316, 318 for the vehicle, the control system 312 can transmit signals to components within the vehicle to change or modify the vehicle based on the current vehicle configuration (also referred to as the current operational parameters of the vehicle) and/or the approaching road conditions. For example, the control system 312 may issue commands to the Electronic Braking System to increase braking capability in the trailer of an articulated vehicle, or to reduce braking capacity in the tractor portion of an articulated vehicle to mirror (within a threshold range) the braking capacity of the tractor portion. In some configurations, the driver of the vehicle can be made aware that the control system 312 is issuing the commands and may need to confirm the change prior to its implementation. In other configurations, the operations mode output by the control system 312 can be displayed to the driver or another individual, who can proceed to manually implement the changes in vehicle configuration as needed.

Figure 4:
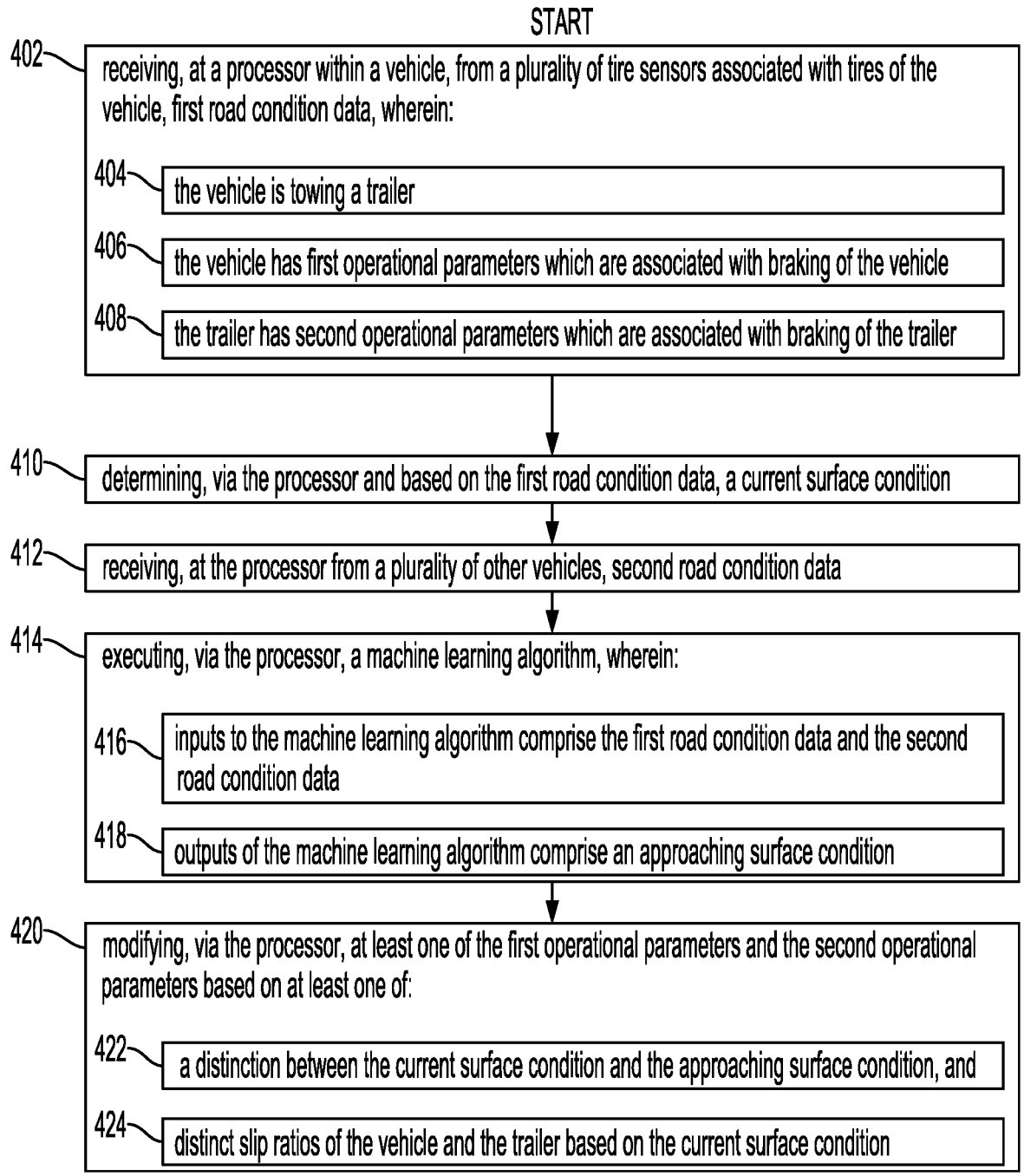
FIG. 4 illustrates an example method embodiment.

FIG. 4 illustrates an example method embodiment. As illustrated, a system configured to practice the method can receive, at a processor within a vehicle, from a plurality of tire sensors associated with tires of the vehicle, first road condition data (402), wherein: the vehicle is towing a trailer (404); the vehicle has first operational parameters which are associated with braking of the vehicle (406); and the trailer has second operational parameters which are associated with braking of the trailer (408). The system can determine, via the processor and based on the first road condition data, a current surface condition (410), and receive, at the processor from a plurality of other vehicles, second road condition data (412). The system can then execute, via the processor, a machine learning algorithm (414), wherein: inputs to the machine learning algorithm comprise the first road condition data and the second road condition data (416), and outputs of the machine learning algorithm comprise an approaching surface condition (418). The system can then modify, via the processor, at least one of the first operational parameters and the second operational parameters (420) based on at least one of: a distinction between the current surface condition and the approaching surface condition (422) and distinct slip ratios of the vehicle and the trailer based on the current surface condition (424).

In some configurations, the illustrated method can further include: generating, via the processor, an operating mode of the vehicle, the operating mode being based the current surface condition, the approaching surface condition, the first operational parameters, and the second operational parameters, the operating mode comprising one of: a warning mode with a severity, where at least one operational parameter of the first operational parameters and the second operational parameters is to be modified based on a distinction between the current surface condition and the approaching surface condition; and a poor surface mode, where at least one operational parameter of the first operational parameters and the second operational parameters is to be modified based on the current surface condition, the first operational parameters, and the second operational parameters. In such configurations, the severity of the warning mode can indicate at least one of a deadline for performing the modifying and a risk level for not performing the modifying.

In some configurations the modifying of at least one of the first operational parameters and the second operational parameters can result in a slip ratio of the vehicle being within a predetermined threshold difference of a slip ratio of the trailer.

In some configurations, the machine learning algorithm is generated by: performing a sensitivity analysis which defines correlations between known values current road condition data and known values of future road condition data; forming, via a computing device, a neural network using the correlations; converting, via the computing device, the neural network to computer executable code, resulting in the machine learning algorithm. In such configurations, the correlations can also be based on GPS (Global Positioning System) data, traffic data, route data, and weather data.

In some configurations, the second road condition data is also received from roadside infrastructure components as a form of V2I communications.

In some configurations, the modifying of at least one of the first operational parameters and the second operational parameters comprises changing at least one of: an understeer allowable band; an oversteer allowable band; a slip ratio band; and a pedal movement to acceleration demand.

Figure 5:
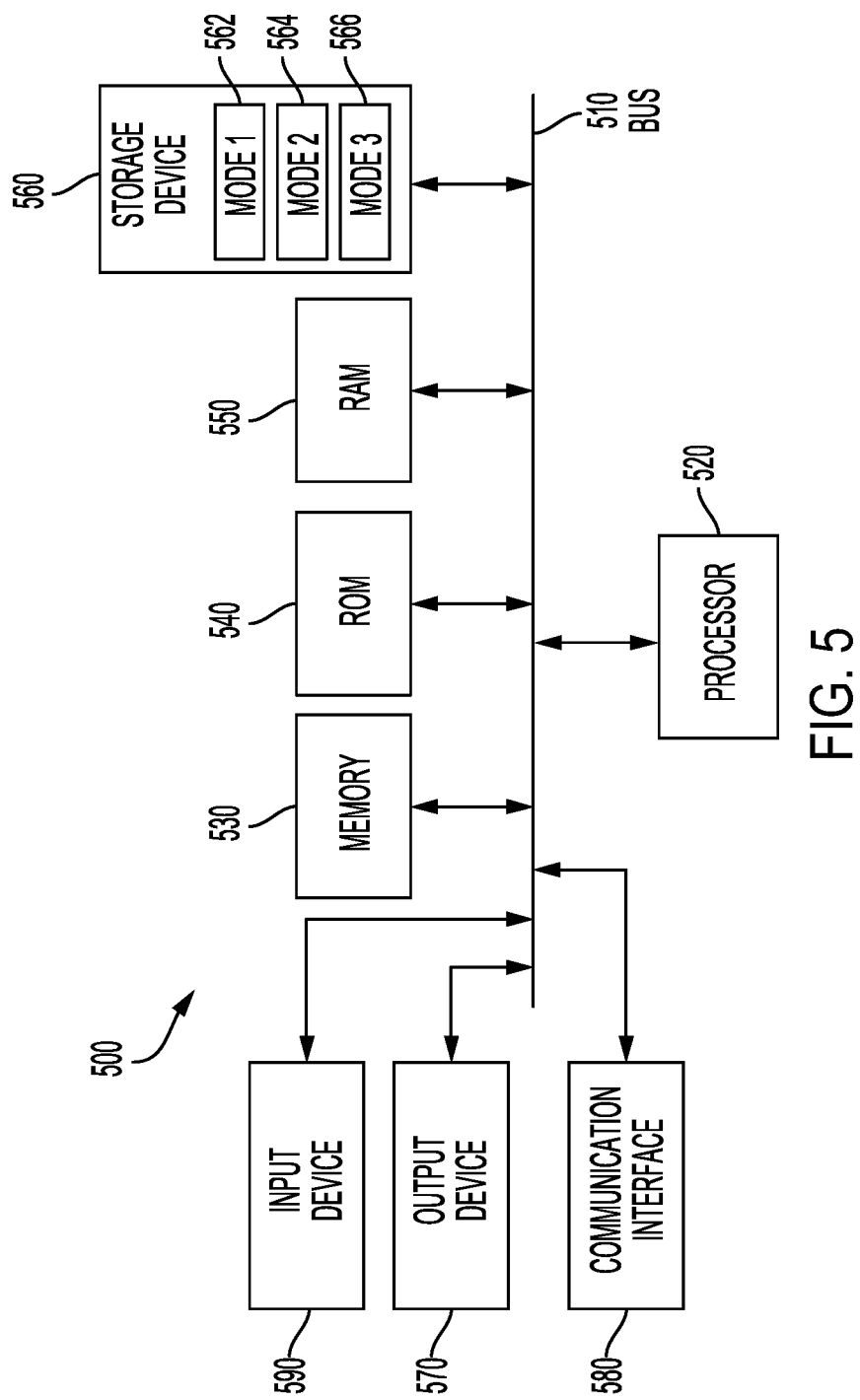
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:
   receiving, at a processor within a vehicle, from a plurality of tire sensors associated with tires of the vehicle, first road condition data, wherein:
      the vehicle is towing a trailer;
      the vehicle has first operational parameters which are associated with braking of the vehicle;
      the trailer has second operational parameters which are associated with braking of the trailer;
   determining, via the processor and based on the first road condition data, a current surface condition;
   receiving, at the processor from a plurality of other vehicles, second road condition data;
   executing, via the processor, a machine learning algorithm, wherein:
      inputs to the machine learning algorithm comprise the first road condition data and the second road condition data; and
      outputs of the machine learning algorithm comprise an approaching surface condition; and
   modifying, via the processor, at least one of the first operational parameters and the second operational parameters based on:
      a distinction between the current surface condition and the approaching surface condition; and
      distinct slip ratios of the vehicle and the trailer based on the current surface condition.

2. The method of claim 1, further comprising:
   generating, via the processor, an operating mode of the vehicle, the operating mode being based the current surface condition, the approaching surface condition, the first operational parameters, and the second operational parameters, the operating mode comprising one of:
      a warning mode with a severity, where at least one operational parameter of the first operational parameters and the second operational parameters is to be modified based on a distinction between the current surface condition and the approaching surface condition; and
      a poor surface mode, where at least one operational parameter of the first operational parameters and the second operational parameters is to be modified based on the current surface condition, the first operational parameters, and the second operational parameters.

3. The method of claim 2, wherein the severity of the warning mode indicates at least one of a deadline for performing the modifying and a risk level for not performing the modifying.

4. The method of claim 1, wherein the modifying of at least one of the first operational parameters and the second operational parameters results a slip ratio of the vehicle being within a predetermined threshold difference of a slip ratio of the trailer.

5. The method of claim 1, wherein the machine learning algorithm is generated by:
   performing a sensitivity analysis which defines correlations between known values current road condition data and known values of future road condition data;
   forming, via a computing device, a neural network using the correlations;
   converting, via the computing device, the neural network to computer executable code, resulting in the machine learning algorithm.

6. The method of claim 5, wherein the correlations are further based on GPS (Global Positioning System) data, traffic data, route data, and weather data.

7. The method of claim 1, wherein the second road condition data is also received from roadside infrastructure components.

8. The method of claim 1, wherein the modifying of at least one of the first operational parameters and the second operational parameters comprises changing at least one of:
   an understeer allowable band;
   an oversteer allowable band;
   a slip ratio band; and
   a pedal movement to acceleration demand.

9. An articulated vehicle, comprising:
   a trailer;
   a truck configured to pull the trailer;
   a plurality of tire sensors;
   a processor;
   a non-transitory computer-readable storage medium having instructions stored which, when executed by the processor, cause the processor to perform operations comprising:
      receiving first operational parameters associated with braking of the truck;
      receiving second operational parameters associated with braking of the trailer;

receiving, from the plurality of tire sensors, first road condition data;

determining, via the processor and based on the first road condition data, a current surface condition;

receiving, from a plurality of other vehicles, second road condition data;

executing a machine learning algorithm, wherein:
inputs to the machine learning algorithm comprise the first road condition data and the second road condition data; and
outputs of the machine learning algorithm comprise an approaching surface condition; and generating an operating mode of the vehicle, the operating mode being based the current surface condition, the approaching surface condition, the first operational parameters, and the second operational parameters, the operating mode being one of a plurality of modes selected from a list comprising:
a normal mode, where no changes to at least one operational parameter of the first operational parameters and the second operational parameters are needed based on a distinction between the current surface condition and the approaching surface condition;
a warning mode with a severity, where at least one operational parameter of the first operational parameters and the second operational parameters is to be modified based on a distinction between the current surface condition and the approaching surface condition; and
a poor surface mode, where at least one operational parameter of the first operational parameters and the second operational parameters is to be modified based on the current surface condition, the first operational parameters, and the second operational parameters; and modifying at least one of the first operational parameters and the second operational parameters based on:
a distinction between the current surface condition and the approaching surface condition; and
distinct slip ratios of the truck and the trailer based on the current surface condition.

10. The articulated vehicle of claim 9, wherein the severity of the warning mode indicates a deadline for performing the modifying.

11. The articulated vehicle of claim 9, wherein the severity of the warning mode indicates a risk level for not performing the modifying.

12. The articulated vehicle of claim 9, wherein the modifying of at least one of the first operational parameters and the second operational parameters results a slip ratio of the truck being within a predetermined threshold difference of a slip ratio of the trailer.

13. The articulated vehicle of claim 9, wherein the machine learning algorithm is generated by:
performing a sensitivity analysis which defines correlations between known values current road condition data and known values of future road condition data;
forming, via a computing device, a neural network using the correlations;
converting, via the computing device, the neural network to computer executable code, resulting in the machine learning algorithm.

14. The articulated vehicle of claim 13, wherein the correlations are further based on GPS (Global Positioning System) data, traffic data, route data, and weather data.

15. The articulated vehicle of claim 9, wherein the second road condition data is also received from roadside infrastructure components.

16. The articulated vehicle of claim 9, wherein the modifying of at least one of the first operational parameters and the second operational parameters comprises changing at least one of:
an understeer allowable band;
an oversteer allowable band;
a slip ratio band; and
a pedal movement to acceleration demand.

17. A non-transitory computer-readable storage medium stored within a vehicle, the non-transitory computer-readable storage medium having instructions stored which, when executed by a processor, cause the processor to perform operations comprising:
receiving, at the processor within the vehicle, from a plurality of tire sensors associated with tires of the vehicle, first road condition data, wherein:
the vehicle is towing a trailer;
the vehicle has first operational parameters which are associated with braking of the vehicle; and
the trailer has second operational parameters which are associated with braking of the trailer;
determining, via the processor and based on the first road condition data, a current surface condition;
receiving, at the processor from a plurality of other vehicles, second road condition data;
executing, via the processor, a machine learning algorithm, wherein:
inputs to the machine learning algorithm comprise the first road condition data and the second road condition data; and
outputs of the machine learning algorithm comprise an approaching surface condition; and
modifying, via the processor, at least one of the first operational parameters and the second operational parameters based on:
a distinction between the current surface condition and the approaching surface condition; and
distinct slip ratios of the vehicle and the trailer based on the current surface condition.

18. The non-transitory computer-readable storage medium stored within a vehicle of claim 17, having additional instructions stored which, when executed by the processor, cause the processor to perform operations comprising:
generating, via the processor, an operating mode of the vehicle, the operating mode being based the current surface condition, the approaching surface condition, the first operational parameters, and the second operational parameters, the operating mode comprising one of:
a warning mode with a severity, where at least one operational parameter of the first operational parameters and the second operational parameters is to be modified based on a distinction between the current surface condition and the approaching surface condition; and
a poor surface mode, where at least one operational parameter of the first operational parameters and the second operational parameters is to be modified based on the current surface condition, the first operational parameters, and the second operational parameters.

19. The non-transitory computer-readable storage medium stored within a vehicle of claim 18, wherein the severity of the warning mode indicates at least one of a deadline for performing the modifying and a risk level for not performing the modifying.

20. The non-transitory computer-readable storage medium stored within a vehicle of claim 17, wherein the modifying of at least one of the first operational parameters and the second operational parameters results a slip ratio of the vehicle being within a predetermined threshold difference of a slip ratio of the trailer.

* * * * *